United States Patent
Ramasamy et al.

(10) Patent No.: US 10,740,408 B2
(45) Date of Patent: Aug. 11, 2020

(54) METHOD AND SYSTEM FOR GENERATING AN ARCHITECTURE DOCUMENT FOR DESCRIBING A SYSTEM FRAMEWORK

(71) Applicant: Accenture Global Solutions Limited, Dublin (IE)

(72) Inventors: Manoharan Ramasamy, Bangalore (IN); Nitin Madhukar Sawant, Mumbai (IN); Jayant Swamy, Bangalore (IN); Himanshu Shah, Thane West (IN)

(73) Assignee: Accenture Global Solutions Limited, Dublin (IE)

( * ) Notice: Subject to any disclaimer, the term of this patent is extended or adjusted under 35 U.S.C. 154(b) by 652 days.

(21) Appl. No.: 15/400,684

(22) Filed: Jan. 6, 2017

(65) Prior Publication Data
US 2017/0199878 A1 Jul. 13, 2017

(30) Foreign Application Priority Data
Jan. 11, 2016 (IN) .............................. 201641001015

(51) Int. Cl.
*G06F 16/93* (2019.01)
*G06F 8/10* (2018.01)
*G06F 8/20* (2018.01)

(52) U.S. Cl.
CPC ................ *G06F 16/93* (2019.01); *G06F 8/10* (2013.01); *G06F 8/20* (2013.01)

(58) Field of Classification Search
CPC ...................................... G06F 8/10; G06F 8/20
See application file for complete search history.

(56) References Cited

U.S. PATENT DOCUMENTS 7,487,471 B2 * 2/2009 Wu ........................ G06Q 10/10
715/761
8,479,149 B2 * 7/2013 Kuriakose ................ G06F 8/36
717/104

(Continued)

OTHER PUBLICATIONS

First Examination Report from corresponding Indian Patent Application No. 201641001015, dated May 12, 2020, 8 pages.

*Primary Examiner* — William Spieler
(74) *Attorney, Agent, or Firm* — Brinks Gilson & Lione (57) ABSTRACT

A system for generating a document includes a user interface processing subsystem configured to generate an interface configured to receive one or more commands. The commands are provided in at least one of an audio format and a textual format. The user interface processing subsystem is configured to provide at least one response to the commands in at least one of: a graphical, audio, and textual format. A natural language processing subsystem of the system is configured to receive and convert the one or more commands into annotated structured text. A search engine of the system is configured to receive the annotated structured text and search a document database for one or more documents related to the annotated structured text. A result processing subsystem in communication with the search engine is configured to rank the one or more documents based on a relevance to the received one or more commands; generate a ranked list of the one or more documents; and communicate the rank list to the user interface processing subsystem. The system is configured to learn, provide advice related to architectures or architecture facts and provide code related to an architecture by searching corpus of frameworks related to architectures and a code repository. The system learns in part based on user feedback and actions.

8 Claims, 9 Drawing Sheets

(56) References Cited

U.S. PATENT DOCUMENTS

| | | | |
|---|---|---|---|
| 8,875,090 B2* | 10/2014 | Fox | G06F 9/44 717/101 |
| 9,009,649 B2* | 4/2015 | Grechanik | G06F 8/36 717/101 |
| 9,015,730 B1* | 4/2015 | Allen | G06F 9/541 719/310 |
| 9,324,025 B2* | 4/2016 | Byron | G06N 5/02 |
| 9,348,894 B2* | 5/2016 | Asadullah | G06F 8/75 |
| 9,459,839 B2* | 10/2016 | Kisynski | G06F 16/22 |
| 9,519,464 B2* | 12/2016 | Dang | G06F 8/36 |
| 9,772,823 B2* | 9/2017 | Allen | G06F 8/34 |
| 10,210,211 B2* | 2/2019 | Yahav | G06F 16/2455 |
| 2005/0262056 A1* | 11/2005 | Hamzy | G06F 8/36 |
| 2006/0212843 A1* | 9/2006 | Zaky | G06F 8/20 717/106 |
| 2009/0210390 A1* | 8/2009 | Lane | G06F 8/36 |
| 2009/0210855 A1* | 8/2009 | Ramanathan | G06F 8/36 717/102 |
| 2010/0106705 A1* | 4/2010 | Rush | G06F 8/36 707/709 |
| 2012/0124547 A1* | 5/2012 | Halbedel | G06F 16/903 717/100 |
| 2012/0311534 A1* | 12/2012 | Fox | G06F 8/36 717/120 |
| 2013/0212562 A1* | 8/2013 | Fox | G06F 8/65 717/120 |
| 2013/0311496 A1* | 11/2013 | Fedorenko | G06F 8/71 707/758 |
| 2014/0372478 A1* | 12/2014 | Zhao | G06F 16/9535 707/770 |
| 2015/0277900 A1* | 10/2015 | O'Keeffe | G06F 8/70 717/113 |
| 2015/0277901 A1* | 10/2015 | Karle | G06F 11/3688 717/120 |
| 2015/0378692 A1 | 12/2015 | Dang et al. | |
| 2016/0196137 A1* | 7/2016 | Allen | G06F 16/951 717/121 |
| 2016/0196204 A1* | 7/2016 | Allen | G06F 16/951 717/125 |
| 2016/0219078 A1* | 7/2016 | Porras | G06F 3/0484 |
| 2017/0017655 A1* | 1/2017 | Pinto | G06F 8/33 |

* cited by examiner

Experience Gained

| Subject Area | Horizontal Scaling | Topic | Platform Installation |
|---|---|---|---|
| Impacted component/functionality | | | |
| Issue or Problem | If application is very large, drupal will generate a big server load. It is because of the large number of modules and hooks, as drupal reloads all modules and calls hooks in each request. | | |
| | Also in each request PHP engine parse the code and converts it into bytecodes thus can be prevented using bytecode caching. | | |
| | Drupal is having performance issue with applications having more non – cacheable dynamic data. | | |
| Lesson Learnt | This kind of approach is recommended for small and medium sized projects only. Larger applications having more dynamic personalized data, page design has to be looked into. | | |
| Implications | You have to choosy in order to pick up the contributed module that suit best as per the requirement. | | |
| Solution | Aggregate Javascript and CSS file. | | |
| | Use bytecode caching and query caching. | | |
| | Page design – minimize the number of elements and task load. | | |

METHOD AND SYSTEM FOR GENERATING AN ARCHITECTURE DOCUMENT FOR DESCRIBING A SYSTEM FRAMEWORK

RELATED APPLICATIONS

This application claims priority to Indian Provisional Application No. 201641001015, filed Jan. 11, 2016, the contents of which are hereby incorporated by reference in their entirety.

BACKGROUND

Field

This application generally relates to document creation. In particular, this application describes a method and system for generating an architecture document for describing a system framework.

Description of Related Art

Numerous individuals typically collaborate to prepare architecture documents to describe the functionality of and interrelationships between components of a system framework. Individuals preparing such documents usually are required to have a deep understanding of previously developed frameworks.

However, finding individuals with such experience in today's tech environment can be challenging given the rate at which technology evolves and the high employee turnover rate that can occur in competitive tech industries. As such, more junior developers are relied upon to create such documents.

Unfortunately, junior developers don't normally have the experience required to efficiently develop a new framework from existing frameworks. This in turn leads to increased cost in developing the documentation, longer lead times in developing the documentation, and possibly implementation of a framework that is not as optimally configured as it could be.

BRIEF SUMMARY

In one aspect, a system for generating a document is provided. The system includes a user interface processing subsystem configured to generate an interface configured to receive one or more commands. The commands are provided in at least one of an audio format and a textual format. The user interface processing subsystem is configured to provide at least one response to the commands in at least one of: a graphical, audio, and textual format. A natural language processing subsystem of the system is configured to receive and convert the one or more commands into annotated structured text. A search engine of the system is configured to receive the annotated structured text and searches a document database for one or more documents related to the annotated structured text in semantic way. A result processing subsystem in communication with the search engine is configured to rank the one or more documents based on a relevance to the received one or more commands; generate a ranked list of the one or more documents; and communicate the rank list to the user interface processing subsystem.

DETAILED DESCRIPTION

Figure 1:
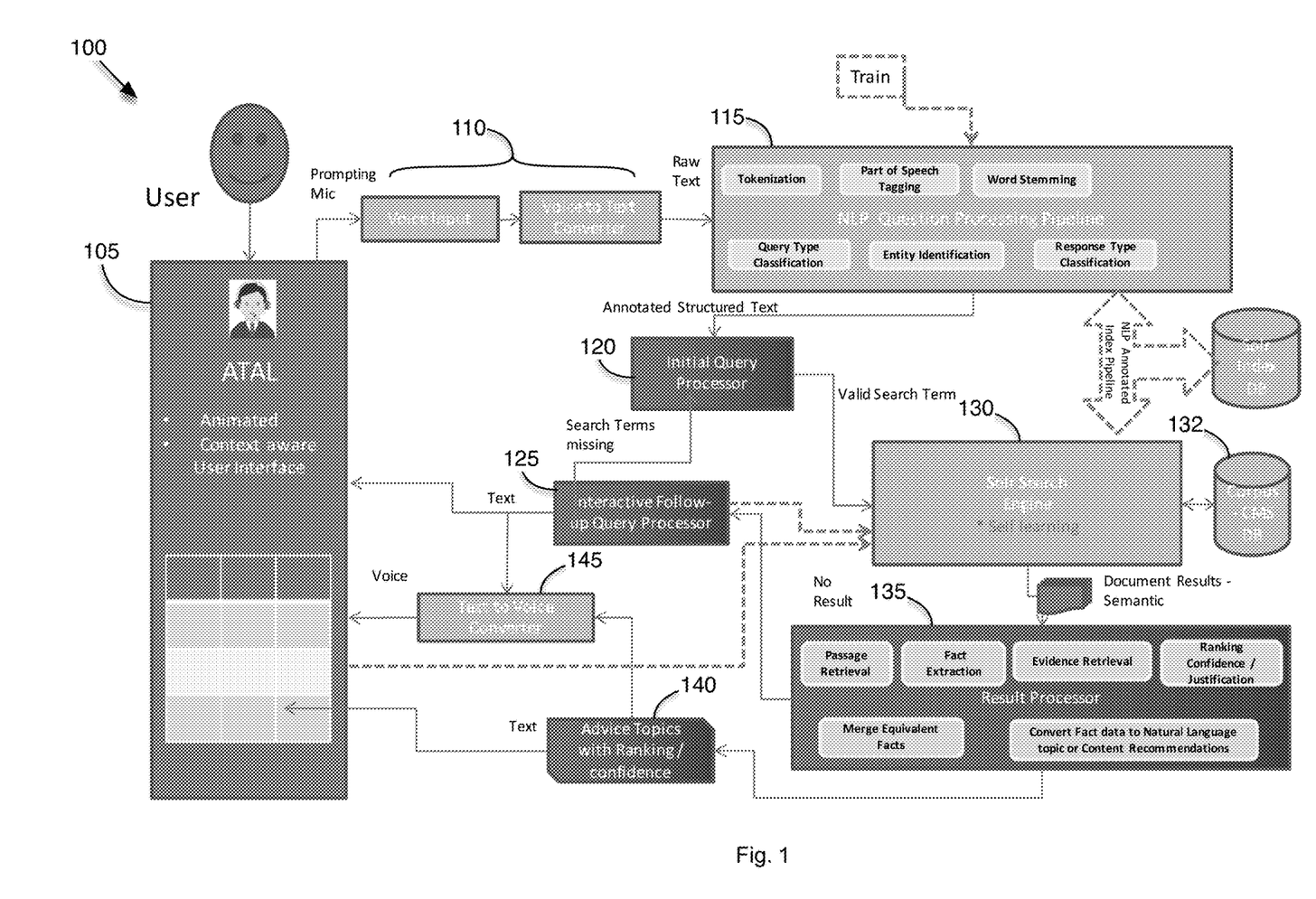
FIG. 1 illustrates an exemplary diagram of a system for generating a document, advice, and a point of view for a user query.

FIG. 1 illustrates an exemplary diagram of a system 100 for generating a document. Major components of the system include a user interface processing subsystem 105, a natural language processing subsystem 115, a search engine sub system 130, and a result processing subsystem 135.

The functionality of the respective subsystems may be implemented by one or more networked computer systems, each of which may be configured to implement specific operations of a given subsystem. For example, the user interface processing subsystem 105 may correspond to a first computer system configured to generate an interface that is in turn configured to receive one or more commands in at least one of: an audio format and a textual format and to provide at least response to the commands in at least one of: a graphical, audio, and textual format.

The natural language processing subsystem 115 may correspond to a second computer system configured to receive and convert the one or more commands into annotated structured text.

The search engine subsystem 130 may correspond to a third computer configured to receive the annotated structured text and search a document database 132 for one or more documents related to the annotated structured text.

The result processing subsystem 135 may correspond to a fourth computer system configured to rank the one or more documents based on a relevance to the received one or more commands, generate a ranked list of the one or more documents; and communicate the rank list to the user interface processing subsystem.

Each computer system may include a processor such as an Intel®, AMD®, or PowerPC® processor or a different processor that implements an IOS®, Android®, or Windows® operating system, or a different operating system. The processor may execute instruction code for implementing operations associated with a particular system. Each computer system may also include an application programming interface (API) to facilitate sending and receiving instructions to and from other computer systems.

Figure 2:
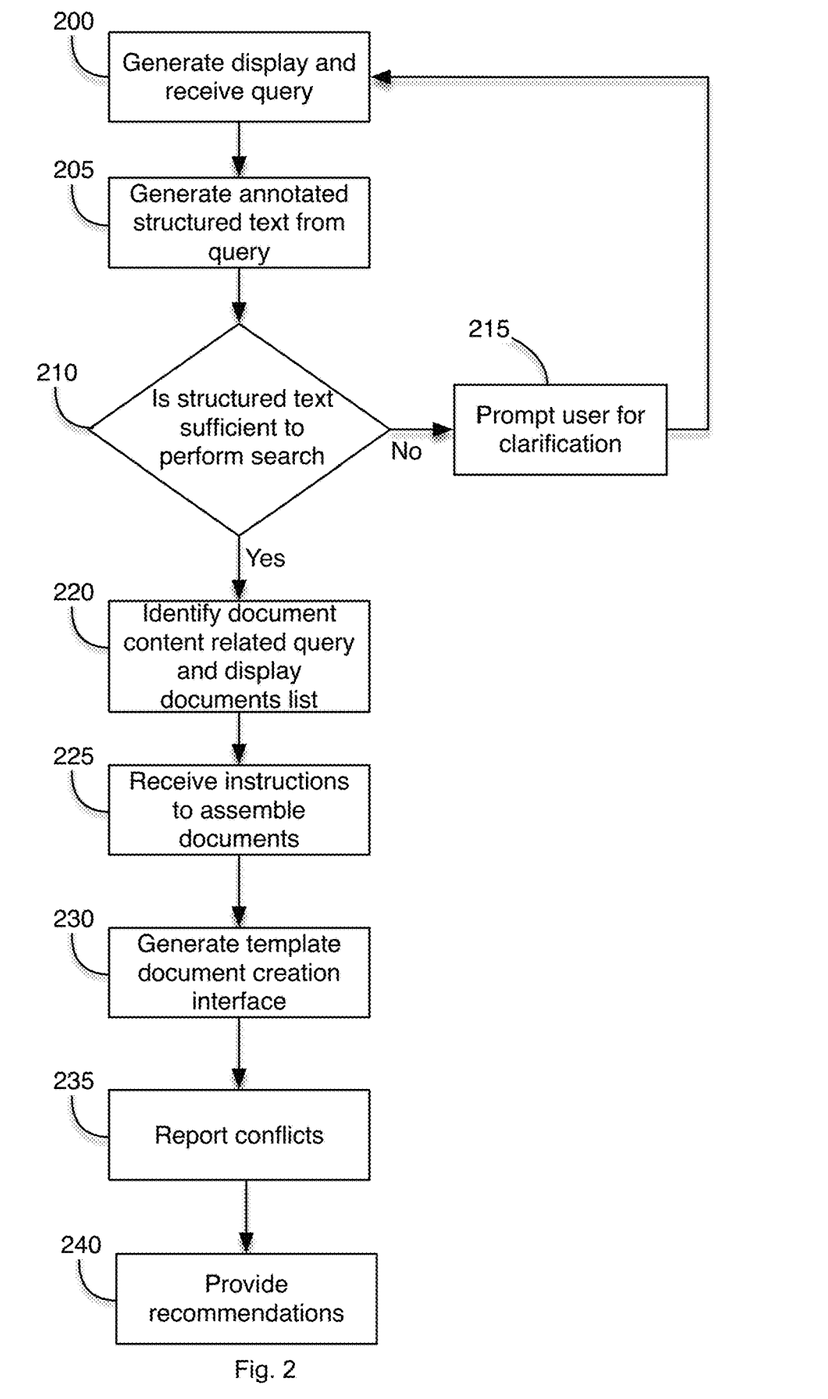
FIG. 2 illustrates a first exemplary group of operations that may be performed by the system 100.

Operations of the system 100 are described in FIG. 2 with reference to FIGS. 3-8. The illustrated operations may be performed by one or more of the computer systems described above. In alternative implementations, the operations may be implemented by a single computer system configured to carry out two or more of the operations described above. In this regard, instruction code for causing the respective processors to carry out the respective operations may be stored in one or more storage devices in communication with the respective processors.

Figure 3:
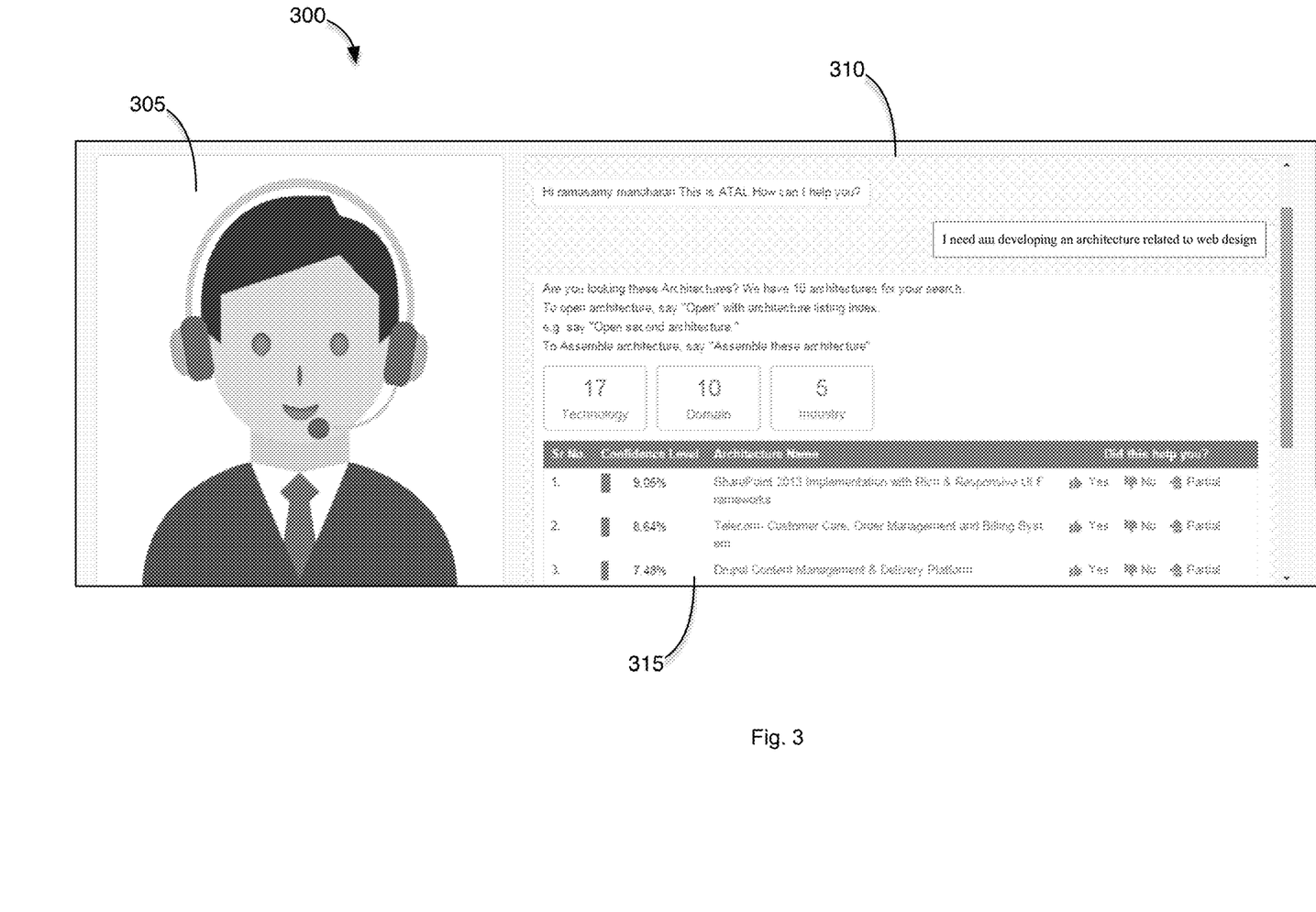
FIG. 3 illustrates a first exemplary user interface generated by the system.

FIG. 2 illustrates an exemplary group of operations that may be performed by the system 100. At block 200, the user interface processing subsystem 105 may generate an interface, such as the interface 300 of FIG. 3. Referring to FIG. 3, the interface 300 includes a virtual assistant 305 and a command/response log 310. The interface 300 may correspond to a webpage on a user computer and the user interface processing subsystem 105 may operate as part of a web server for serving the webpage.

The virtual assistant 305 is configured to provide human-like feelings with greeting messages, smileys based on the context, etc. In operation, a user of the system may specify a type of architecture document upon which to base a new architecture document. For example, the user may type or speak the query "I am developing an architecture related to web design." If spoken, a voice-to-text subsystem 110 may convert the phrase to text. The voice-to-text and text-to-voice conversion may take place on the user computer and be implemented by a JavaScript processor executed within the user's browser.

At block 205, the phrase is converted to annotated structured text. For example, the phrase may be communicated to the natural language processing subsystem 115. The phrase can be expressed in various ways though they are same. For example, the phrase may be an interrogative such as "What is the best framework for a Responsive Design?". The phrase may be assertive such as "Tell me the name of the framework for Responsive Design." An annotated version of such a query may look like " QUERY1: +("The Best" OR content:"The Best")^1.11 ("Best", content:"Best")^1.11 ("Best" OR content:"Best")^1.11+("the best" OR content: "the best")^1.11 ("Responsive web design" OR content: "Responsive web design")^1.11 ("Responsive"~4)^2.22 (content:"Responsive"~4)^2.22 ("Web Design"~12)^1.11 (content:"Web Design"~12)^1.11 ("The Best the best"~36) ^0.555 (content:"The Best the best"~36)^0.555 QUERY2: ("The Framework" OR content:"The Framework")^1.11 ("Responsive web design" OR content:"Responsive web design")^2.1 ("Framework Responsive"~6)^3.33 (content: "Framework Responsive"~6)^3.33 ("Framework Webdesign"~18)^1.665 (content:"Framework webdesign"~18) ^1.665 ("Web design"~54)^0.8325 (content:"web design"~54)^0.8325. These queries stress on focus, entities, list of trees of search, and relation detection, answer type and removing stop words. Thus framing useful semantic search queries, via machine learning algorithms."

The natural language processing subsystem 115 recognizes equivalent questions, regardless of how they are presented. This in turn facilitates translation of a complex question into a series of simpler questions, which helps to identify ambiguities in the questions and to treat them in context or by interactive clarification.

The natural language processing subsystem 115 includes several modules that cooperate to convert the query to annotated structured text. These pipeline operations performed by the modules may be carried out sequentially or in parallel using open source apache UIMA framework.

A tokenization module breaks up a list of strings into pieces called tokens or words or terms. This is achieved via java language tokenization techniques.

A part-of-speech tagging module (POS tagging or POST), also called grammatical tagging or word-category disambiguation, marks up a word in a text (corpus) as corresponding to a particular part of speech, based on both its definition and its context. I.e., its relationship with adjacent and related words in a phrase, sentence, or paragraph. For example, the part-of-speech tagging module tags the different portions of text of the phrase as being nouns, verbs, adjectives, adverbs, etc.

A word stemming module reduces inflected (or sometimes derived) words to their word stem, base or root form—generally a written word form.

A query type classification module classifies a query phrase as being related, for example, to advice of technical topic/architecture, opinion about fitment of tools, advice of topics, architecture, technologies, and/or questions words such as what, which, when, where, who, how, why, etc.

An entity identification module, or named-entity recognition (NER) module, (entity chunking and entity extraction) is a subtask of information extraction that seeks to locate and classify elements in text into pre-defined categories such as the names of tools, technology topics, technologies, processes, organizations, locations, expressions of times, quantities, monetary values, percentages, etc. Identifying entity in given context helps to understand the user's question.

A response-type-classification module specifies the kind of entity the response should consists of such as architecture documents, tools, or a topic or a technical point of view. There are 3 major places the entire chain of operations happens. 1. Query Processing, 2. System learning during indexing of architecture corpus, 3. Response processing pipeline. Java-based analysis engines are custom developed on top of open source apache UIMA framework for processing the above pipelines.

At block 210, an initial query processor 120 of the system 100 determines whether the annotated structured text includes enough information to conduct a meaningful search by the search engine 130. If more information is required, then at block 215, the annotated structured text may be communicated to an interactive follow-up query processor 125.

The interactive follow-up query processor 125 is configured to determine what additional information is required to clarify the annotated structured text and to generate a query to the user for the requested information. For example, the annotated structured text may include nouns 1 and 2 but may be missing a verb. The interactive follow-up query processor 125 may generate a query, such as "What would you like to do with noun1 and noun2?". The query may be communicated to the user interface processing subsystem 105, which may in turn convey one or both of a visual an audible version of the query. The response to the query from the user may be combined with the initial query provided by the user and processed once more by the natural language processing subsystem 115 to thereby refine the annotates structured text further.

If at block 210, the initial query processor of the system 100 determines that the annotated structured text includes enough information to conduct a meaningful search, the annotated structured text is communicated to the search engine subsystem 130.

At block 220, the search engine subsystem 130 searches a database of documents 132 for relevant documents. The search engine subsystem 130 may correspond to the open source enterprise search platform Solr. The search engine subsystem 130 may accept the annotated structured text and provide document result semantics associated with the relevant documents. The Solr Search engine is customized to stored indexes of the architecture documents corpus using an NLP pipeline. So the indexes are matched with the annotated queries to provide semantic search results. Results will be based on relevant context and not based on plain keyword searching.

Next, the document semantics are communicated to the result processing subsystem 135. The result processing subsystem is configured to extract content from the semantically searched documents and to rank the extracted content based on relevance to the user's query. The result processing subsystem 135 includes several modules that cooperate to rank the documents as to relatedness to the user's query.

A passage retrieval module of the result processing subsystem 135 is configured to retrieve those passages from the semantically searched documents that are related to the user's query. A fact extraction module is configured to extract facts from the retrieved passages. An evidence retrieval module is configured to cross-validate with the response type and entity analysis and checks for evidence in the retrieved fact. Evidence retrieval works by vector space model using text weighting approach, based on term frequency and occurrence of evidence in more than one document in corpus. Also the previous user feedback also taken into consideration. A fact ranking module is configured to rank the facts based on multiple algorithms such as term weighting approach. Architecture advices based on architecture facts are provided by fact retrieval module. Similar to lexicon of English language, Architecture Rule and facts are stored in Experienced gained document of the corpus collection. The agent provides architecture suggestions by running architectural rule against each line of a newly created document by determining the facts of the passages/sentences created. In advice section Feedback from user also in taken in to consideration for self-improving of corpus or training of the system. A merge module is configured to merge facts that are equivalent to one another to thereby eliminate the duplicate facts. A fact conversion module is configured to convert the fact data to a natural language topic or to content recommendations. A document ranking module is configured to generate an ordered list of of documents corresponding to the semantically searched documents that are related to the query. The ranking of the documents is based on the how the facts are ranked by the fact ranking module.

Information that defines the ranked documents is then communicated to the user interface processing subsystem 105. For example, the interface 300 generated by the user interface processing subsystem 105 may be updated to display a list of relevant documents in the log 310, as illustrated in FIG. 4.

The user may review the list of documents indicated as being relevant and indicate whether the documents are indeed relevant. In this case, an indication of whether a document is relevant to the query (or not as the case may be) may be communicated back to the search engine 130. The search engine 130 may be configured to take this information into consideration for future determinations regarding the relatedness of a document to a query.

Figure 4:
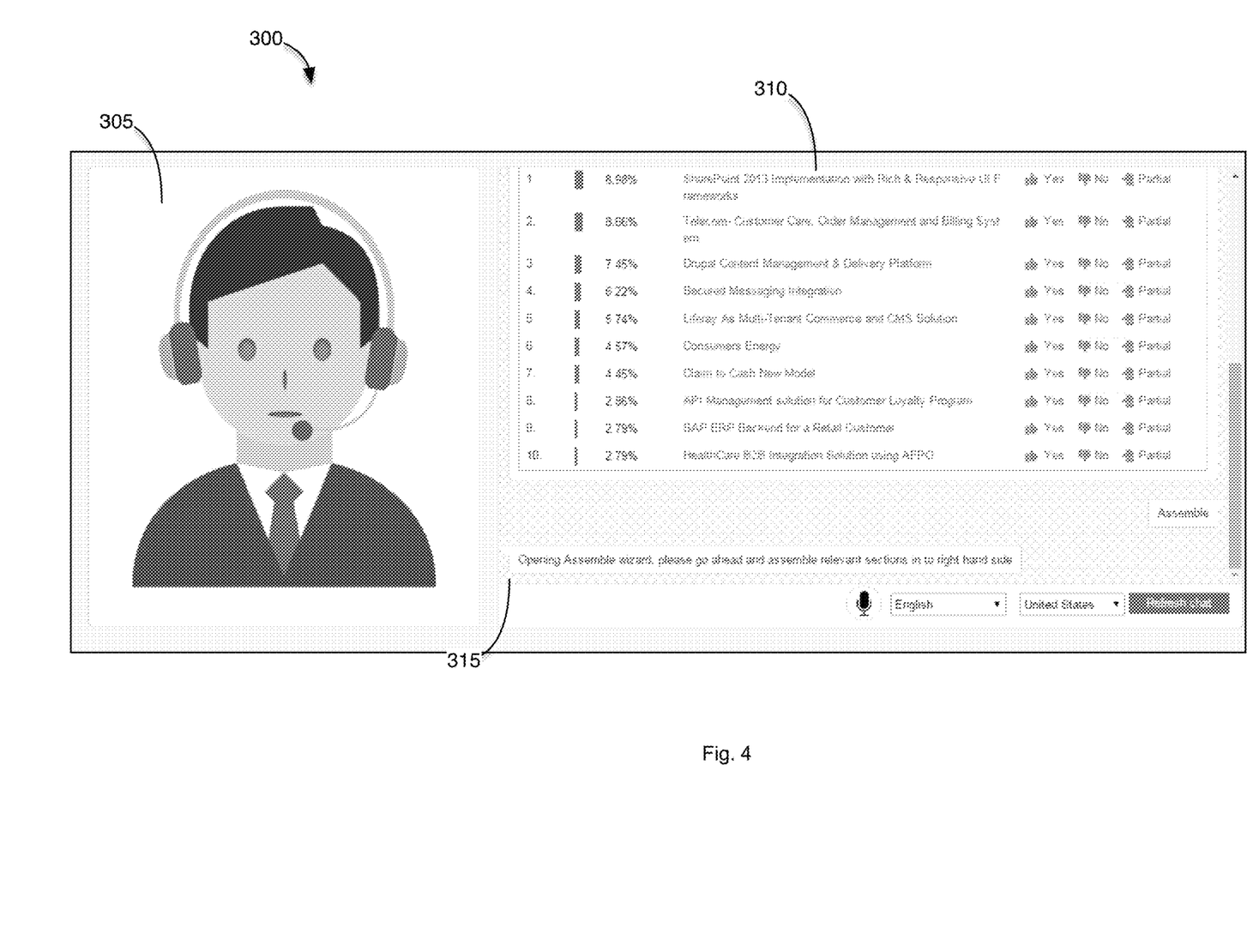
FIG. 4 illustrates a ranked list of documents on the first exemplary user interface.

At block 225, the user may specify, via the interface 300, that he would like to assemble one or more of the documents identified at block 220, as illustrated in the interface of FIG. 4. For example, the user may say the command "Open assemble wizard, please go ahead and assemble relevant section into the right hand side."

Figure 5:
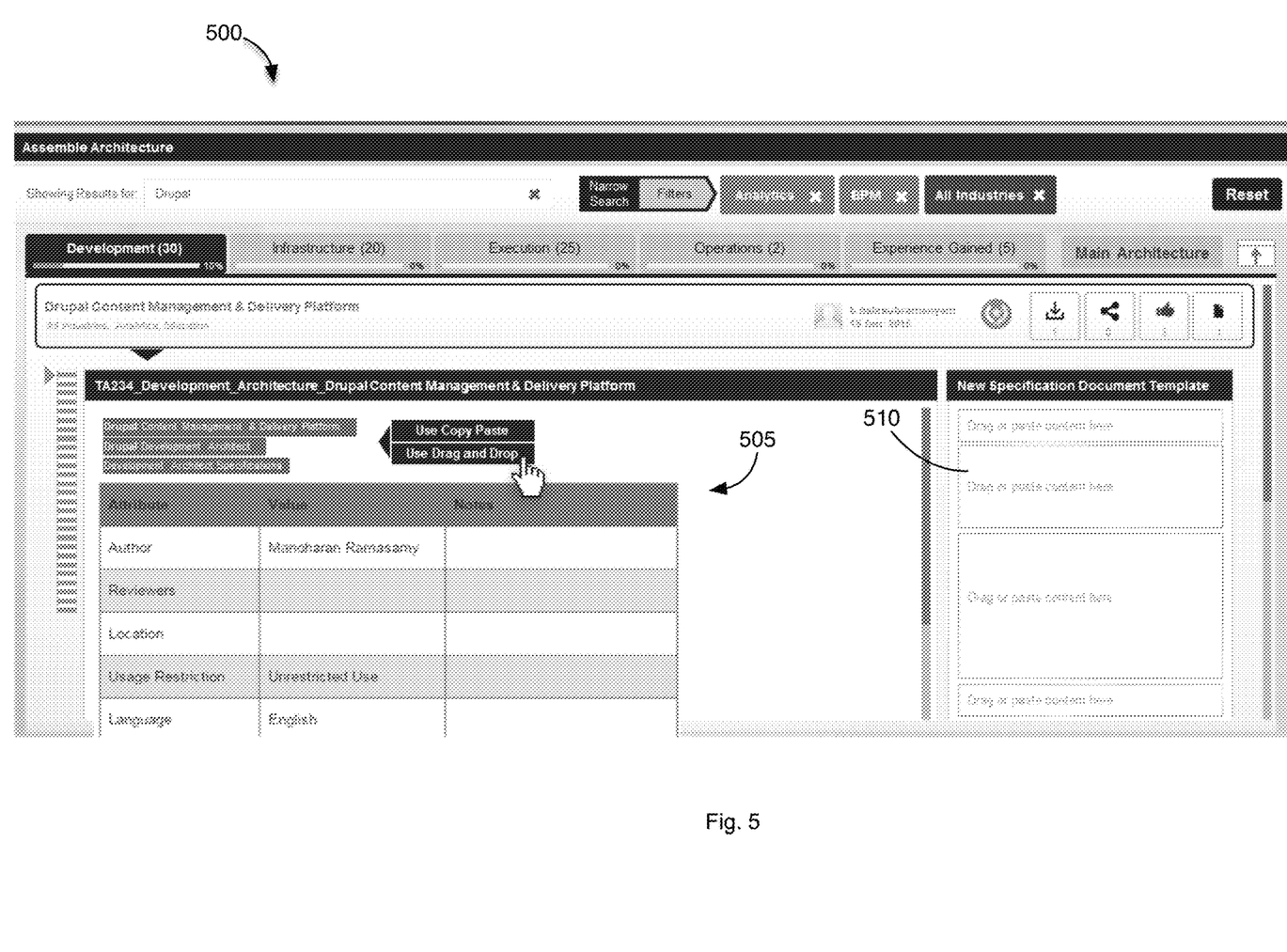
FIG. 5 illustrates a second exemplary user interface generated by the system for assembling a document template from content of one or more of the documents in the ranked list.

At block 230, in response to the user command, the user interface processing subsystem 105 may generate the second interface 500 illustrated in FIG. 5. The second interface 500 includes a document review section 505 and a document template creation section 510.

The document review section 505 is configured to display the content of a document selected by the user for possible inclusion into the document template. For example, the text, tables, images, etc. that may be within the document may be displayed. In some implementations, the only content shown may be the content that was determined by the passage retrieval module of the result processing subsystem 135 to be related to the query. For example, paragraphs, tables, etc. of the document that are related to the query may be shown or highlighted, etc.

In some implementations, the user may scroll up and down to view the content. The document review section 505 is further configured to allow the user to select portions of the document and/or the content sections related to the query and to drag the portions to the document template creation section 510. In this way, the user may copy one or more portions from the documents selected for assembly to the template to thereby build a document template directed to the desired architecture the user is trying to build. The user may then save the document template for future editing and or updates.

Figure 6:
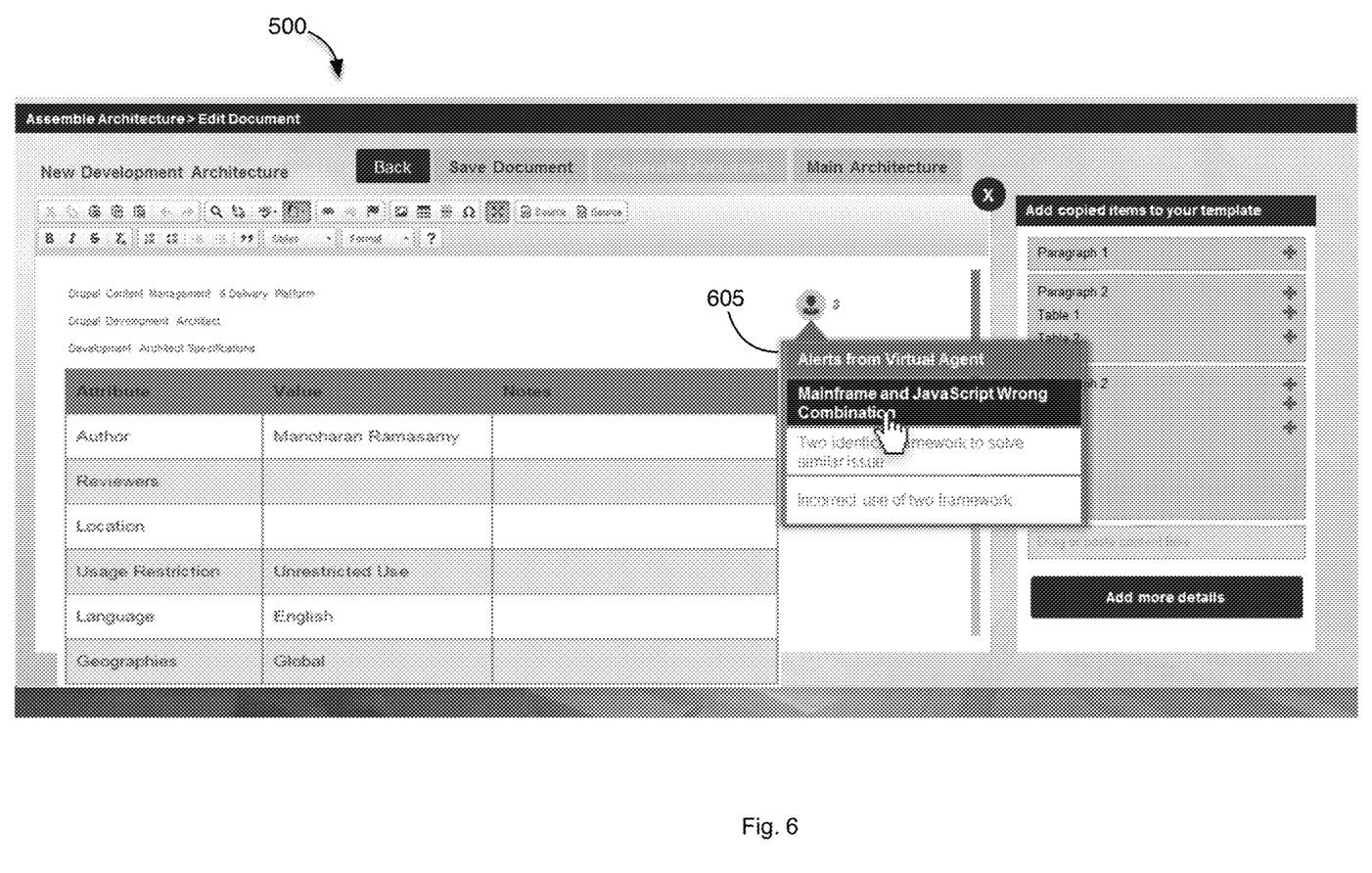
FIG. 6 illustrates an exemplary alert list that displays a list of issues identified in the document template.

At block 235, the document review section 505 is configured to display alerts to the user that indicate potential conflicts between sections from different documents that were assembled together in the document template creation section 510. FIG. 6 illustrates an exemplary alert message 605 that may be displayed in the interface 505. The alert message list several possible problems related to the merging of content from different documents into the document template.

For example, the first item warns the user that content taken from two different documents and combined within the document template may conflict. The second item warns the user that content from two framework documents that solve the same issue are being merged. In other words, the content merged into the document template may be redundant. The third item indicates that a selected framework document is being used incorrectly.

Figure 7:
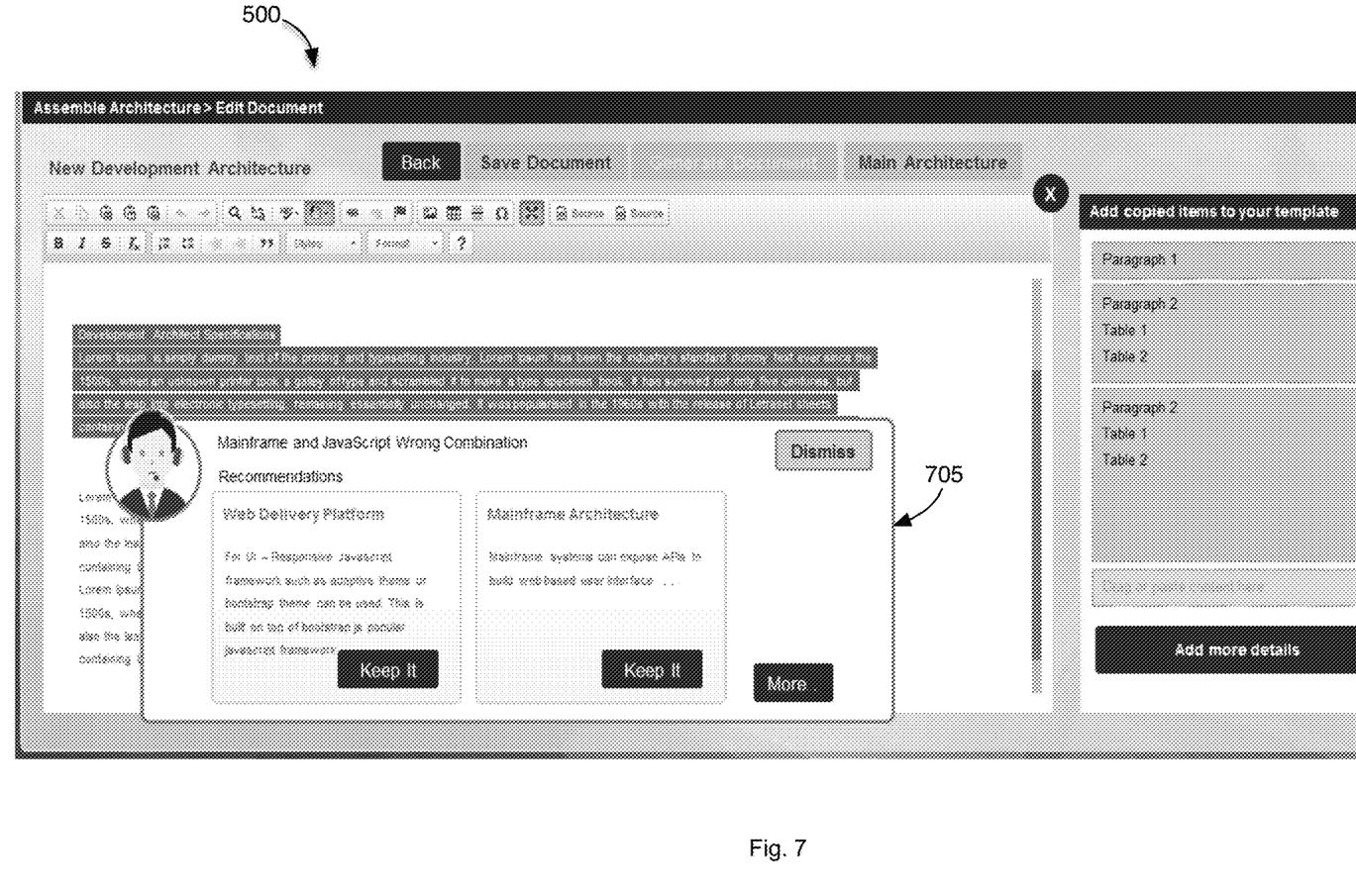
FIG. 7 illustrates an exemplary dialog box that provides details related to a selected item in the alert list.

The user may select a given alert item to find out more information. For example, the user may select the first item, which may cause the alert dialog 705 to be displayed. The alert dialog 705 may display the conflicting content and request that the user select the preferred content. In this case, the content that is not preferred may be removed from the document template.

At block 240, recommendations regarding potential issues and/or other content that should be included into the document template may be communicated to the user. In this regard, one or more documents determined to be related to the query may include summary sections such as the exemplary summary section 800 illustrated in FIG. 8. The exemplary summary section 800 lists issues being solved by the architecture framework that is the subject of the document along with lessons learned after the framework was put to use. For example, in the exemplary summary section, the lessons learned indicates that the framework had performance issues with applications that utilized non-cacheable dynamic data. This information may be relayed to the user if the user chooses to combine content of the document associated with the exemplary summary section 800 with other content related to documents having to do with applications that utilize non-cacheable dynamic data.

Figure 8:
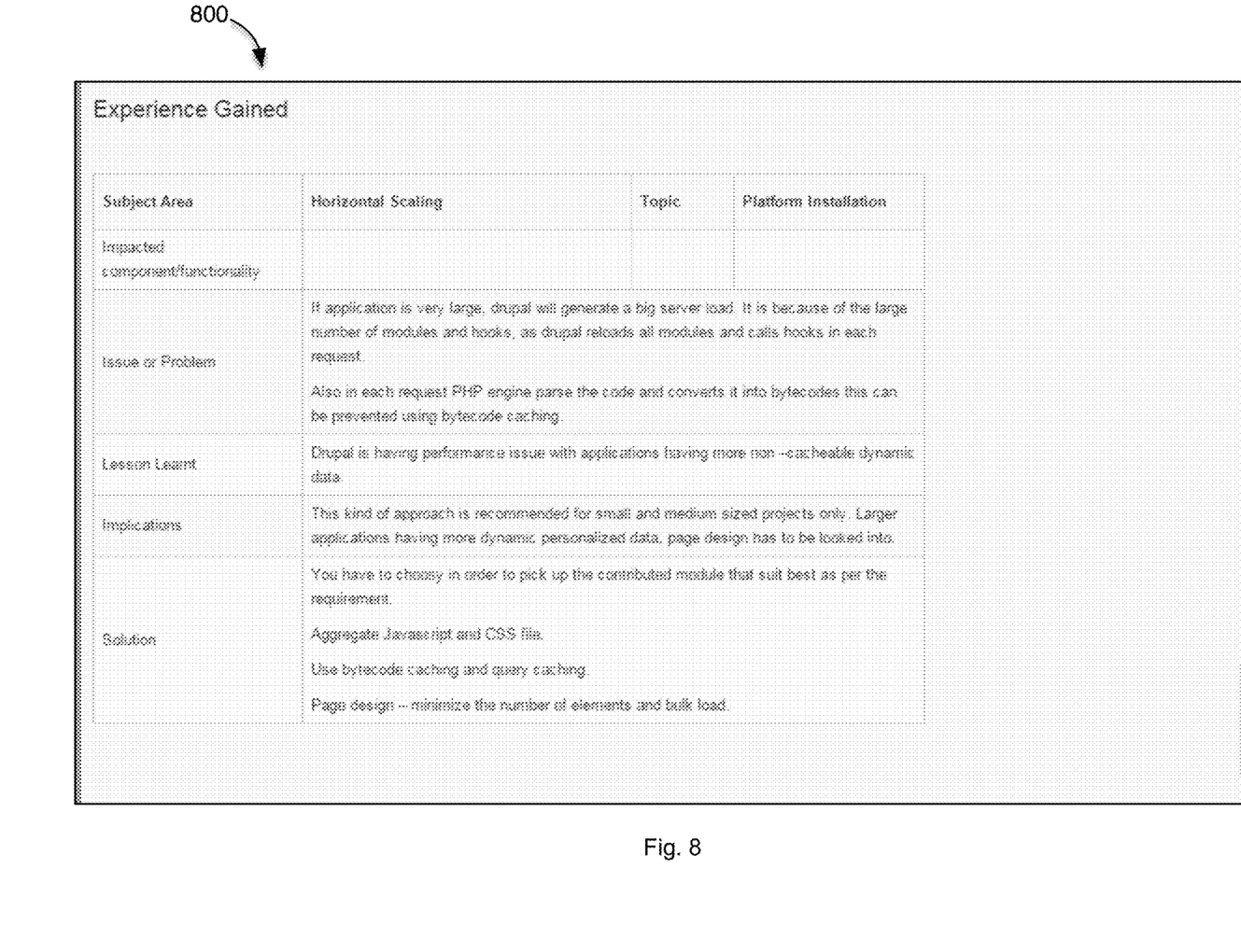
FIG. 8 illustrates an exemplary summary section that may be provided in a document of the ranked list of documents.

In other instances, the lessons learned or other sections of the summary section 800 may indicate certain other frameworks that should be combined with the framework associated with the summary section. In this case, a recommendation for adding content from the other frameworks may be communicated to the user.

In addition, a code repository that includes code associated with various frameworks may be searched to locate code sections associated with those frameworks upon which the document template is based. The located code sections may be presented to a user in the form of a code listing that includes the located code sections.

Figure 9:
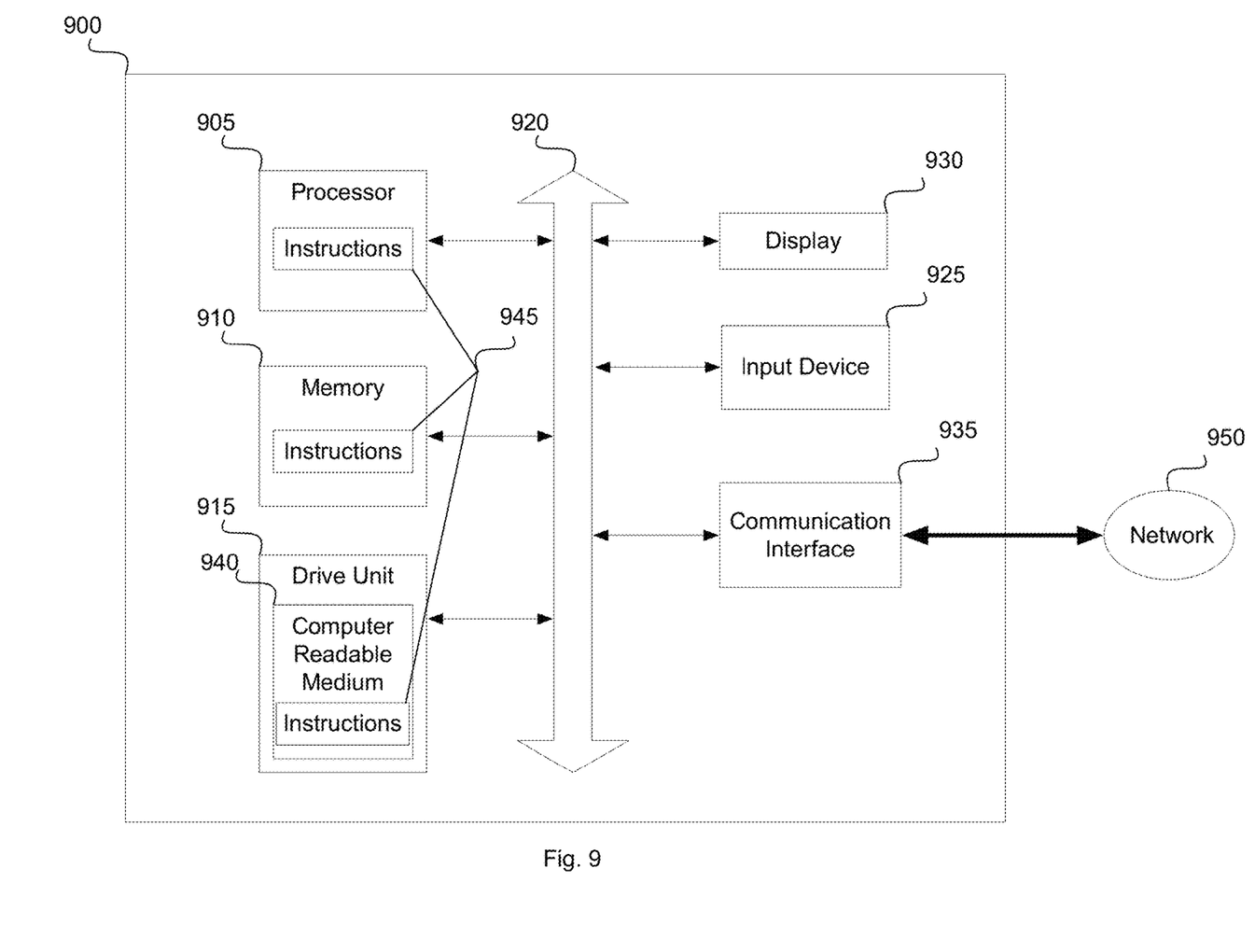
FIG. 9 illustrates a computer system that may correspond to one or more subsystems of the system.

FIG. 9 illustrates a computer system 900 that may form part of or implement the system 105 such as the the score generator 107, the root-cause analyzer 109, the customer satisfaction visualizer 110, the network optimizer 111, and/or any other module referenced herein. The computer system 900 may include a set of instructions 945 that the processor 905 may execute to cause the computer system 900 to perform any of the operations described above. The computer system 900 may operate as a stand-alone device or may be connected, e.g., using a network, to other computer systems or peripheral devices.

In a networked deployment, the computer system 900 may operate in the capacity of a server or as a client-user computer in a server-client user network environment, or as a peer computer system in a peer-to-peer (or distributed) network environment. The computer system 900 may also be implemented as or incorporated into various devices, such as a personal computer or a mobile device, capable of executing the instructions 945 (sequential or otherwise) that specify actions to be taken by that machine. Further, each of the systems described may include any collection of subsystems that individually or jointly execute a set, or multiple sets, of instructions to perform one or more computer functions.

The computer system 900 may include one or more memory devices 910 on a bus 920 for communicating information. In addition, code operable to cause the computer system to perform any of the operations described above may be stored in the memory 910. The memory 910 may be a random-access memory, read-only memory, programmable memory, hard disk drive or any other type of memory or storage device.

The computer system 900 may include a display 930, such as a liquid crystal display (LCD), a cathode ray tube (CRT), or any other display suitable for conveying information. The display 930 may act as an interface for the user to see the functioning of the processor 905, or specifically as an interface with the software stored in the memory 910 or in the drive unit 915.

Additionally, the computer system 900 may include an input device 925, such as a keyboard or mouse, configured to allow a user to interact with any of the components of system 900.

The computer system 900 may also include a disk or optical drive unit 915. The disk drive unit 915 may include a computer-readable medium 940 in which the instructions 945 may be stored. The instructions 945 may reside completely, or at least partially, within the memory 910 and/or within the processor 905 during execution by the computer system 900. The memory 910 and the processor 905 also may include computer-readable media as discussed above.

The computer system 900 may include a communication interface 935 to support communications via a network 950. The network 950 may include wired networks, wireless networks, or combinations thereof. The communication interface 935 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A system for assembling an architecture document comprising:
   a memory;
   a communication interface; and
   a processor in communication with the memory and the communication interface, the processor being configured with a plurality of processing subsystems, the plurality of processing subsystems comprising:
   a user interface processing subsystem configured to generate an interface configured to receive one or more commands in at least one of: an audio format and a textual format and to provide at least one response to the commands in at least one of: a graphical, audio, and textual format;
   a natural language processing subsystem configured to receive and convert the one or more commands into annotated structured text; a
   query processing subsystem comprising an initial query processor and an interactive follow-up query processor, the initial query processor configured to analyze the annotated structured text and determine that an additional command is desired, in response to determining that an additional command is desired, the interactive follow-up processor is configured to generate a request to the user interface processing subsystem to receive an additional command from the user, and, in response to receiving the additional command, to generate a revised annotated structured text;
   a search engine configured to receive the revised annotated structured text and search a document database for one or more documents related to the revised annotated structured text;

a result processing subsystem in communication with the search engine configured to:
rank the one or more documents based on a relevance to the received one or more commands;
generate a ranked list of the one or more documents; and
communicate the ranked list to the user interface processing subsystem; and wherein the user interface processing subsystem is further configured to:
generate a second interface configured to receive a selection of one or more of the documents in the ranked list;
after receiving the selection, display contents of the one or more selected documents;
determine whether content copied from a first document selected from the ranked list conflicts with content copied from a second document selected from the ranked list and conflicts with any experienced gained documents in storage; and
in response to determining that content copied from the first document selected from the ranked list conflicts with content copied from the second document selected from the ranked list and conflicts with any of the experienced gained documents in the storage, transmit an alert of said conflict with recommended actions,
wherein the second interface is configured to facilitate copying portions of the content of the one or more selected documents to a template document.

2. The system according to claim 1, wherein the search engine is configured to search content of the one or more documents related to the annotated structured text to generate a list of one or more suggested documents, wherein the list of one or more suggested documents is communicated to the user interface processing subsystem.

3. A method for assembling an architecture document comprising:
generating an interface configured to receive one or more commands in at least one of: an audio format and a textual format and to provide at least one response to the commands in at least one of: a graphical, audio, and textual format;
converting, by a natural language processing subsystem, the one or more commands into annotated structured text;
analyzing the annotated structured text and determining that an additional command is desired, in response to determining that an additional command is desired generating a request to the interface to receive an additional command from a user, and in response to receiving the additional command, generating a revised annotated structured text;
searching, by a search engine, a document database for one or more documents related to the revised annotated structured text;
ranking, by a result processing subsystem in communication with the search engine the one or more documents based on a relevance to the received one or more commands;
generating a ranked list of the one or more documents;
communicating the ranked list to the user interface processing subsystem for display;
generating a second interface configured to receive a selection of one or more of the documents in the ranked list;
after receiving the selection, displaying contents of the one or more selected documents;
determining whether content copied from a first document selected from the ranked list conflicts with content copied from a second document selected from the ranked list and conflicts with any experienced gained documents in storage; and
in response to determining that the content copied from the first document selected from the ranked list conflicts with the content copied from the second document selected from the ranked list and conflicts with any of the experienced gained documents in the storage, transmitting an alert of said conflict with recommended actions,
wherein the second interface is configured to facilitate copying portions of the content of the one or more selected documents to a template document.

4. The method according to claim 3, further comprising generating a list of one or more suggested documents based on content of the selected documents and communicating the list of suggested documents to the user interface processing subsystem for display.

5. A non-transitory machine-readable storage medium having stored thereon a computer program comprising at least one code section for generating a document, the at least one code section being executable by a machine for causing the machine to perform acts of:
generating an interface configured to receive one or more commands in at least one of: an audio format and a textual format and to provide at least one response to the commands in at least one of: a graphical, audio, and textual format;
converting the one or more commands into annotated structured text;
analyzing the annotated structured text and determining that an additional command is desired, in response to determining that an additional command is desired generating a request to the interface to receive an additional command from a user, and in response to receiving the additional command, generating a revised annotated structured text;
searching a document database for one or more documents related to the revised annotated structured text;
ranking the one or more documents based on a relevance to the received one or more commands;
generating a ranked list of the one or more documents;
communicating the ranked list to a display;
generating a second interface configured to receive a selection of one or more of the documents in the ranked list;
after receiving the selection, displaying contents of the one or more selected documents;
determining whether content copied from a first document selected from the ranked list conflicts with content copied from a second document selected from the ranked list and conflicts with any experienced gained documents in storage; and
in response to determining that the content copied from the first document selected from the ranked list conflicts with the content copied from the second document selected from the ranked list and conflicts with any of the experienced gained documents in the storage, transmitting an alert of said conflict with recommended actions,
wherein the second interface is configured to facilitate copying portions of the content of the one or more selected documents to a template document.

6. The non-transitory machine-readable storage medium according to claim 5, wherein the at least one code section is executable by the machine for causing the machine to perform acts of: generating a list of one or more architecture advisory based on content of the selected documents and communicating the list of architecture advisory content to the user interface processing subsystem for display.

7. The non-transitory machine-readable storage medium according to claim 5, wherein the at least one code section is executable by the machine for causing the machine to perform acts of: learning software architecture facts and concepts based on an architecture corpus available in the system and improving and learning architecture rules based on feedback given by user using algorithmic and self learning capabilities.

8. The non-transitory machine-readable storage medium according to claim 5, wherein the at least one code section is executable by the machine for causing the machine to perform acts of: automatically searching inside a codebase and providing coding recommendations from code repository.

* * * * *